E. M. HASTINGS & H. C. BILBRO.
COMBINED SALT AND PEPPER SHAKER.
APPLICATION FILED JUNE 30, 1908.

923,650.

Patented June 1, 1909.

Witnesses
Hugh H. Ott.
Irving King

Inventors:
Edmund M. Hastings
Howard C. Bilbro
By Victor J. Evans
Attorney

UNITED STATES PATENT OFFICE.

EDMUND M. HASTINGS AND HOWARD C. BILBRO, OF BIRMINGHAM, ALABAMA.

COMBINED SALT AND PEPPER SHAKER.

No. 923,650.　　　Specification of Letters Patent.　　　Patented June 1, 1909.

Application filed June 30, 1908. Serial No. 441,112.

*To all whom it may concern:*

Be it known that we, EDMUND M. HASTINGS and HOWARD C. BILBRO, citizens of the United States, residing at Birmingham, in the county of Jefferson and State of Alabama, have invented new and useful Improvements in Combined Salt and Pepper Shakers, of which the following is a specification.

This invention relates to improvements in combined salt and pepper shakers, and one of the principal objects of the same is to provide a rigid cover and a movable cover for the salt and pepper, and means carried by the movable cover for automatically keeping the pepper receptacle closed.

An object of the invention is to provide a device of this character which is simple in construction, efficient in practice and one which can be manufactured and sold at a comparatively low cost.

With the above and other objects in view the invention consists in the details of construction and in the arrangement of parts which will be hereinafter more fully described and claimed.

Figure 1:
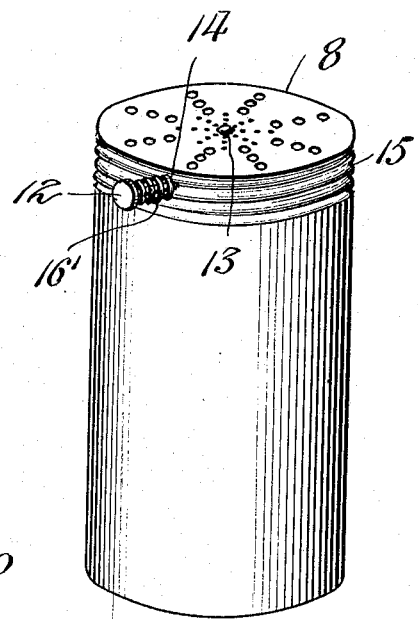
Figure 3:
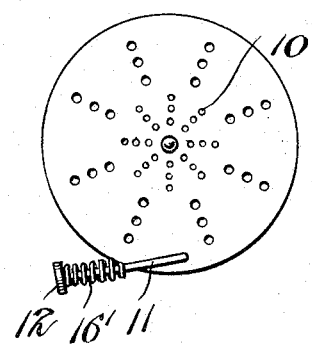
Figure 2:
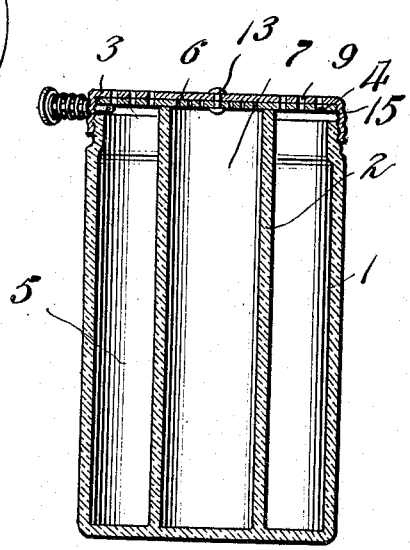

These and other objects may be attained by means of the construction illustrated in the accompanying drawing, in which:

Figure 1 is a perspective view of a combined salt and pepper shaker made in accordance with our invention. Fig. 2 is a central vertical section of the same, and Fig. 3 is an under plan view of one of the disks.

Referring to the drawing for a more particular description of our device reference numeral 1 designates the salt shaker which may be made of glass or other suitable material, and having located or integrally disposed therein a pepper container 2 which projects above the top edge of the salt shaker, thereby forming a space for the actuating stem which will be later described, to ride. A perforated disk 3 is provided with a series of perforations 4, which overlie the salt compartment 5, and a series of smaller perforations 6 disposed above the top of the pepper chamber 7. The said disk 3 is pivotally connected to the cap or cover 8 and is seated upon the top edge of the pepper container 2. The cover 8 is formed with a series of perforations 9 of similar size to those designated by 6, and disposed above the salt chamber. A series of perforations 10 are formed in the cap 8, and said perforations are adapted to be brought into register with the perforations 6 in the disk 3 by means of an actuating stem or pin 11, the latter having one of its ends secured to the disk 3, while the free end thereof is formed with an enlarged actuating head 12. The stem 11 projects laterally through an aperture 14 in the threaded flange 15 of the cap. Encircling the stem is a coil spring 16', having one of its ends abutting against the actuating head 12 while the other end contacts with a portion of the threaded flange 15.

When desiring to use pepper the actuating stem is pressed and the latter will ride in the space disposed between the top edge of the salt compartment and the top edge of the pepper container and turn the disk 3 until the perforations 6 therein registers with the perforations 10 in the cap, such movement of the disk throwing the perforations 4 out of registry with the perforations 9 in the cap and closing the salt compartment. After sufficient quantity of pepper has been obtained, the pressure upon the actuating stem is released and coil spring 16' will automatically return the disk 3 to its respective position. The enlarged head 12 prevents the spring from being displaced from the stem. Attention is directed to the fact that the shaker is always set for salt.

From the foregoing description taken in connection with the accompanying drawing, the construction and mode of operation of the invention should be clearly understood without a further extended description.

Changes in form, proportions and minor details of construction may be made within the scope of the claim without departing from the spirit or sacrificing any of the advantages thereof.

Having thus described the invention what is claimed as new, is:

A combined salt and pepper shaker comprising a salt receptacle, a pepper receptacle located in and projecting above the salt receptacle, a cover provided with perforations and a flange threadedly engaging the salt receptacle, a disk interiorly pivoted to said cover and seated upon the top edge of the pepper receptacle, thereby forming a space between the top of the salt compartment and the pepper receptacle, a stem carried by the disk and adapted to ride in the space between the top of the salt compartment and the pepper receptacle, a portion of the stem projecting tangentially through said flange, a spring encircling said extended portion of the stem, said spring abutting at one end against the flange and at the other end against the head for automatically closing the pepper receptacle and leaving the salt perforations open.

In testimony whereof we affix our signatures in presence of two witnesses.

EDMUND M. HASTINGS.
HOWARD C. BILBRO.

Witnesses:
　EDWARD T. RICE,
　S. H. RICE.